United States Patent
Muramoto et al.

(10) Patent No.: US 12,104,973 B2
(45) Date of Patent: Oct. 1, 2024

(54) COMBINED SENSOR

(71) Applicant: Yazaki Corporation, Tokyo (JP)

(72) Inventors: Daichi Muramoto, Shizuoka (JP); Shingo Nomoto, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 291 days.

(21) Appl. No.: 17/902,138

(22) Filed: Sep. 2, 2022

(65) Prior Publication Data
US 2023/0070528 A1   Mar. 9, 2023

(30) Foreign Application Priority Data

Sep. 6, 2021 (JP) .................................. 2021-144463

(51) Int. Cl.
*G01L 19/00* (2006.01)
*G01K 7/22* (2006.01)
*G01L 19/14* (2006.01)

(52) U.S. Cl.
CPC ............ *G01L 19/0092* (2013.01); *G01K 7/22* (2013.01); *G01L 19/14* (2013.01)

(58) Field of Classification Search
CPC . G01L 19/0092; G01L 19/14; G01L 19/0076; G01L 19/0084; G01L 19/143; G01K 7/22; G01K 1/08; G01K 1/14; G01K 13/02

See application file for complete search history.

(56) References Cited

U.S. PATENT DOCUMENTS

| | | | |
|---|---|---|---|
| 5,070,706 A * | 12/1991 | Waters | G01L 19/0092 374/E13.006 |
| 7,043,993 B2 | 5/2006 | Hayashi et al. | |
| 9,841,335 B2 * | 12/2017 | Rueth | G01L 9/00 |
| 2010/0002745 A1 | 1/2010 | Stoll et al. | |

FOREIGN PATENT DOCUMENTS

| | | |
|---|---|---|
| DE | 10 2013 211 479 A1 | 12/2014 |
| JP | 2010-503000 A | 1/2010 |

* cited by examiner

*Primary Examiner* — David Z Huang
(74) *Attorney, Agent, or Firm* — Sughrue Mion, PLLC

(57) ABSTRACT

Provided is a combine sensor including a pressure sensor module as a pressure detector, a thermistor unit as a temperature detector, a housing portion housing the temperature detector closer to a flow path than the pressure detector. The temperature detector includes a thermistor case where a first lead and a second lead connected to a thermistor are partially embedded. The thermistor case includes an extension part and a ring part including a flow hole part. The thermistor is supported by the extension part to be arranged outside an opening end. The extension part is provided by being separated into a portion where the first lead is embedded and a portion where the second lead is embedded, along an extending direction of the extension part, and includes a space portion communicating with the flow hole part and the outside.

6 Claims, 8 Drawing Sheets

COMBINED SENSOR

CROSS REFERENCE TO RELATED APPLICATION

The present application is based on, and claims priority from the prior Japanese Patent Application No. 2021-144463, filed on Sep. 6, 2021, the entire contents of which are incorporated herein by reference.

TECHNICAL FIELD

The present disclosure relates to a combined sensor.

BACKGROUND

There have been combined sensors for detecting the two parameters of pressure and temperature of a detection medium. Japanese Translation of PCT International Application Publication No. 2010-503000 discloses a technique related to a combined sensor including a pressure sensor and a thermistor arranged in a flow path for detecting a temperature of a detection medium.

SUMMARY

In the combined sensor disclosed in Japanese Translation of PCT International Application Publication No. 2010-503000, the thermistor is covered with a metal member as a whole and is arranged in the flow path, and thus the thermistor has a high heat transfer property, but is easily radiated and has a low temperature responsiveness.

It is an object of the disclosure to provide a combined sensor that enhances the temperature responsiveness.

A combined sensor of an embodiment includes a pressure detector that detects a pressure of a detection medium flowing through a flow path, a temperature detector that detects a temperature of the detection medium using a thermistor, and a housing portion that houses the temperature detector closer to the flow path than the pressure detector and includes a through hole part at an inner peripheral side of the housing portion, one end of the through hole part being an opening end that is open to the flow path, wherein the temperature detector includes a first lead and a second lead connected to the thermistor, and a thermistor case in which a part of the first lead and a part of the second lead are embedded, the thermistor case includes an extension part that passes through the through hole part of the housing portion, and a ring part that includes a flow hole part having one end continuous with the extension part and another end facing the pressure detector, the detection medium flowing through the flow hole part, the thermistor is supported by the extension part to be arranged outside the opening end of the housing portion, and the extension part is provided by being separated into a portion where the first lead is embedded and a portion where the second lead is embedded, along an extending direction of the extension part, and includes a space portion communicating with the flow hole part of the ring part and with the outside.

DETAILED DESCRIPTION

Figure 1:
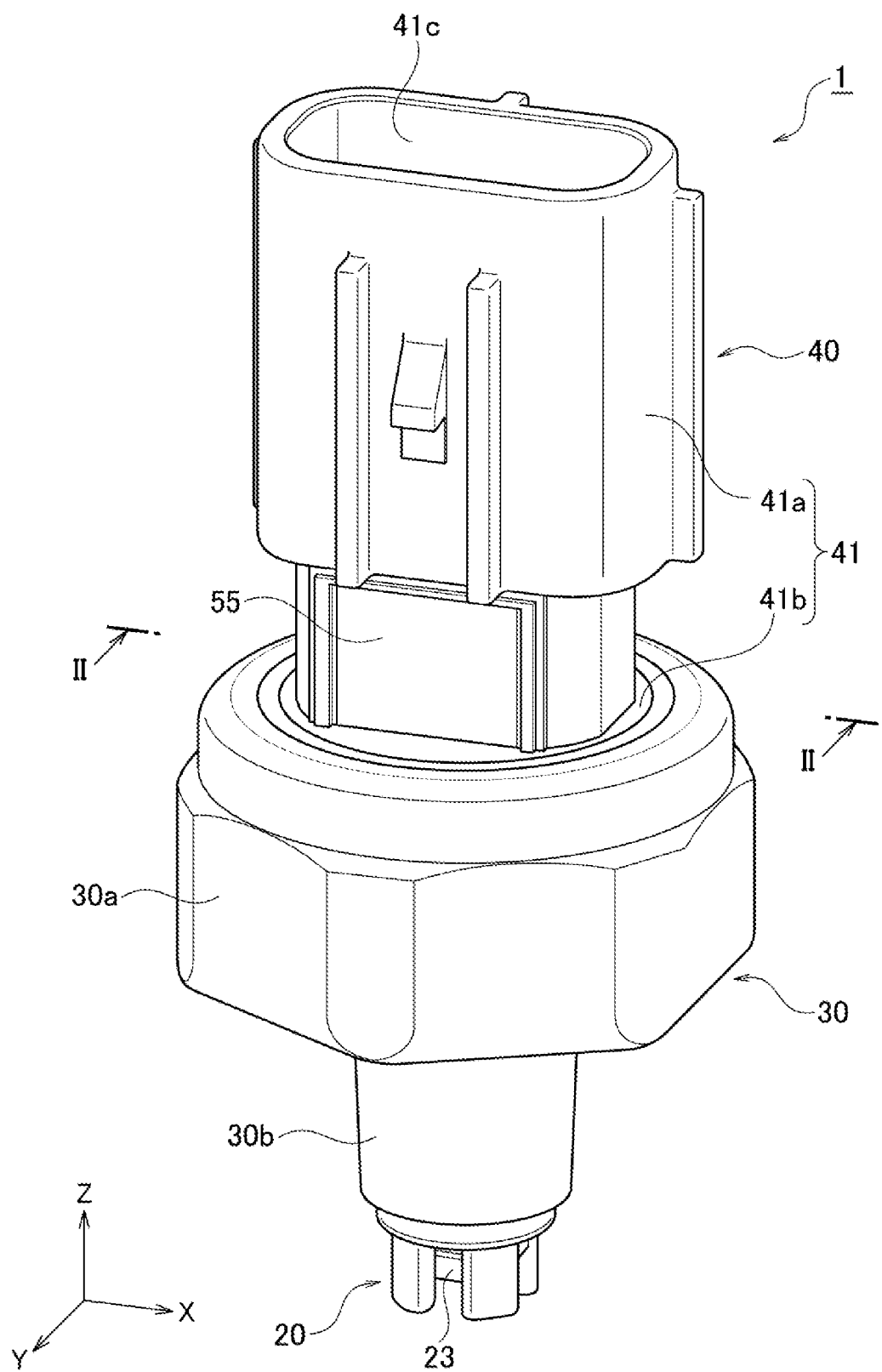
FIG. 1 is a perspective view of a combined sensor according to an embodiment.

Various embodiments will be described hereinafter with reference to the accompanying drawings.

A detailed description is given below of a combined sensor according to an embodiment with reference to the drawings. Note that dimensional ratios in the drawings are exaggerated for convenience of explanation and may be different from actual ratios.

Figure 2:
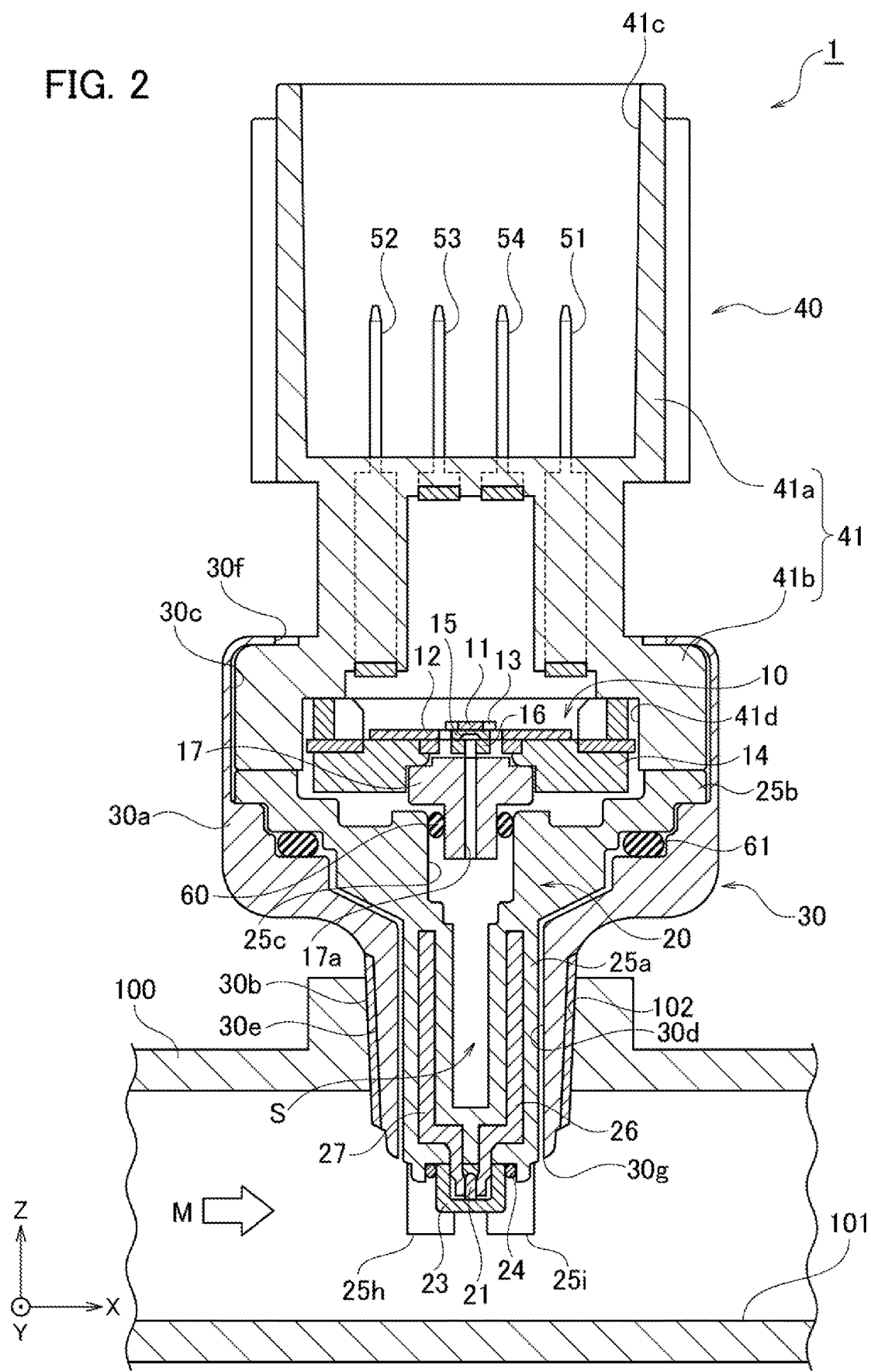
FIG. 2 is a cross-sectional view of a combined sensor according to an embodiment.

FIG. 1 is a perspective view of a combined sensor 1 according to an embodiment. FIG. 2 is a cross-sectional view of the combined sensor 1 taken along the line II-II of FIG. 1.

The combined sensor 1 detects a pressure and a temperature of a detection medium M. The detection medium M in the present embodiment is, for example, engine oil flowing through an engine of a vehicle or the like. FIG. 2 depicts a part of a mounted member 100 assumed to be an engine including a flow path 101 through which the detection medium M flows. The combined sensor 1 is mounted on the mounted member 100 by fastening a screw part 30e, which will be described later, in a mounting hole part 102 formed in the mounted member 100.

In the following drawings, the extension direction of the flow path 101 in the mounted member 100 is defined as an X direction. Directions perpendicular to each other on a plane perpendicular to the X direction are defined as a Y direction and a Z direction. The passing-through direction of the mounting hole part 102 is along the Z direction. Each direction in the combined sensor 1 described below is also adjusted to the directional indication of XYZ.

The combined sensor 1 includes a pressure sensor module 10, a thermistor unit 20, a housing portion 30, and a connector portion 40.

Figure 3:
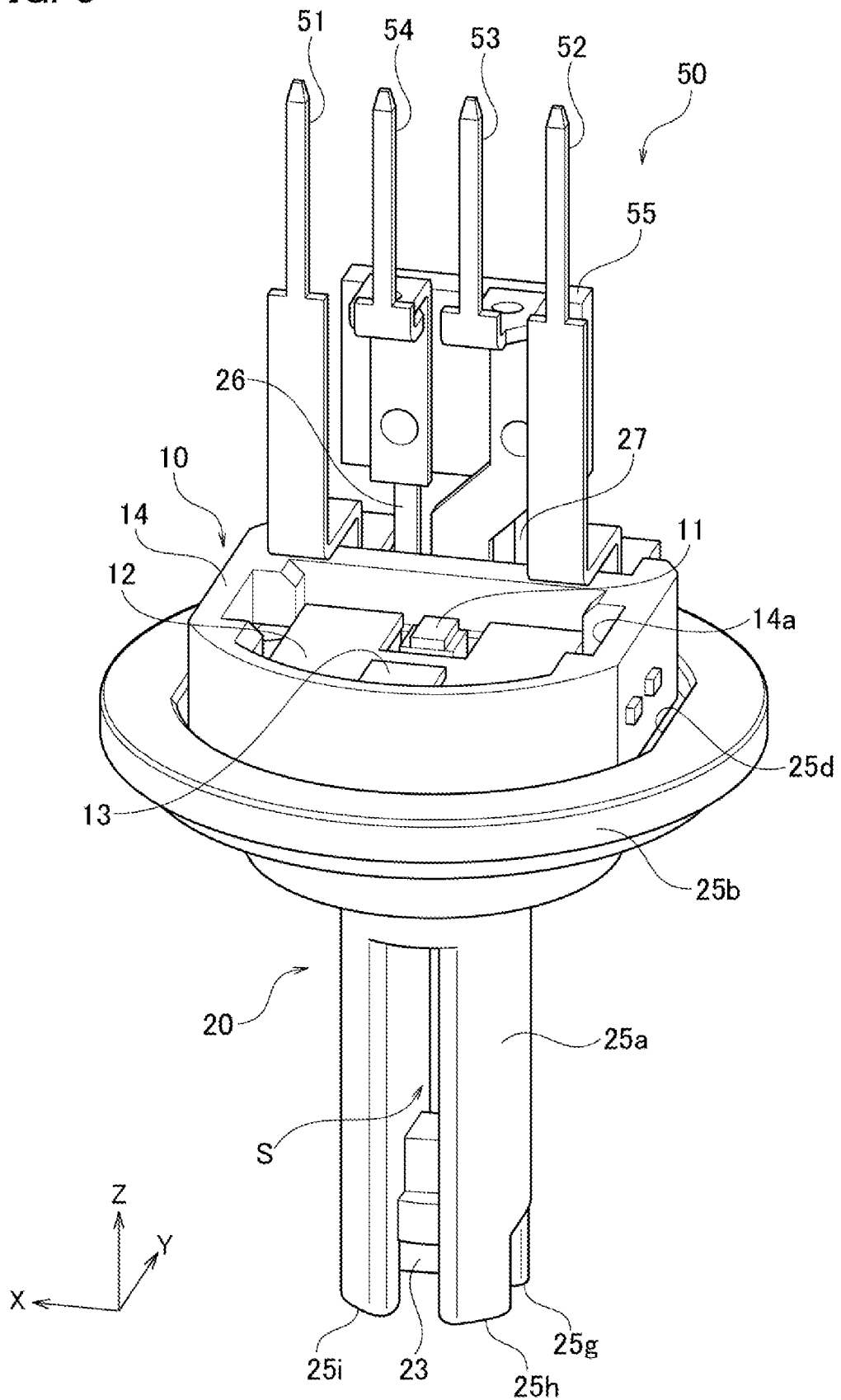
FIG. 3 is a perspective view of a combination of detecting units.

FIG. 3 is a perspective view of a combination of the pressure sensor module 10 and the thermistor unit 20. FIG. 3 also depicts a terminal portion 50 included in the connector portion 40.

The pressure sensor module 10 is a pressure detector that detects a pressure of the detection medium M flowing through the flow path 101. The pressure sensor module 10 includes a pressure sensor element 11, a wiring board 12, a signal processing circuit 13, and a unit case 14.

The pressure sensor element 11 is a sensor unit used to detect the pressure of the detection medium M. In the present embodiment, the pressure sensor element 11 employs a gauge pressure type based on the atmospheric pressure. The pressure range of the pressure sensor element 11 is, for example, 0.5 to 20 MPa. Note that the pressure sensor element 11 can be appropriately changed depending on the type of the detection medium M, use conditions, or the like. For example, the pressure sensor element 11 may be an absolute pressure type. The pressure range may be different from the range of the above example.

The wiring board 12 is, for example, a printed circuit board and includes the pressure sensor element 11, the signal processing circuit 13, and the like installed thereon. The signal processing circuit 13 is an IC chip that performs predetermined processing and the like on a sensor signal output from the pressure sensor element 11. The signal processing circuit 13 is electrically connected to the terminal portion 50. The unit case 14 is a unit body made from resin and includes a housing space portion 14a for housing the pressure sensor element 11, the wiring board 12, and the signal processing circuit 13.

Depending on the type of the pressure sensor element 11, the pressure sensor module 10 may include a diaphragm 15, a glass pedestal 16, and a stem 17 as illustrated in FIG. 2. The diaphragm 15 transmits a pressure change in the detection medium M as a deformation force to the pressure sensor element 11. The glass pedestal 16 in a tubular shape supports the diaphragm 15. The stem 17 is an intermediate member that supports the glass pedestal 16 and is interposed for connecting the pressure sensor module 10 and the thermistor unit 20. The stem 17 includes a hole 17a passing therethrough along the central axis. The detection medium M flowing through the space portion S, which will be described later, reaches the diaphragm 15 through the hole 17a. A first O-ring 60 filling a flow hole part 25c included in the thermistor unit 20 is mounted on the outer periphery of the stem 17.

Figure 4:
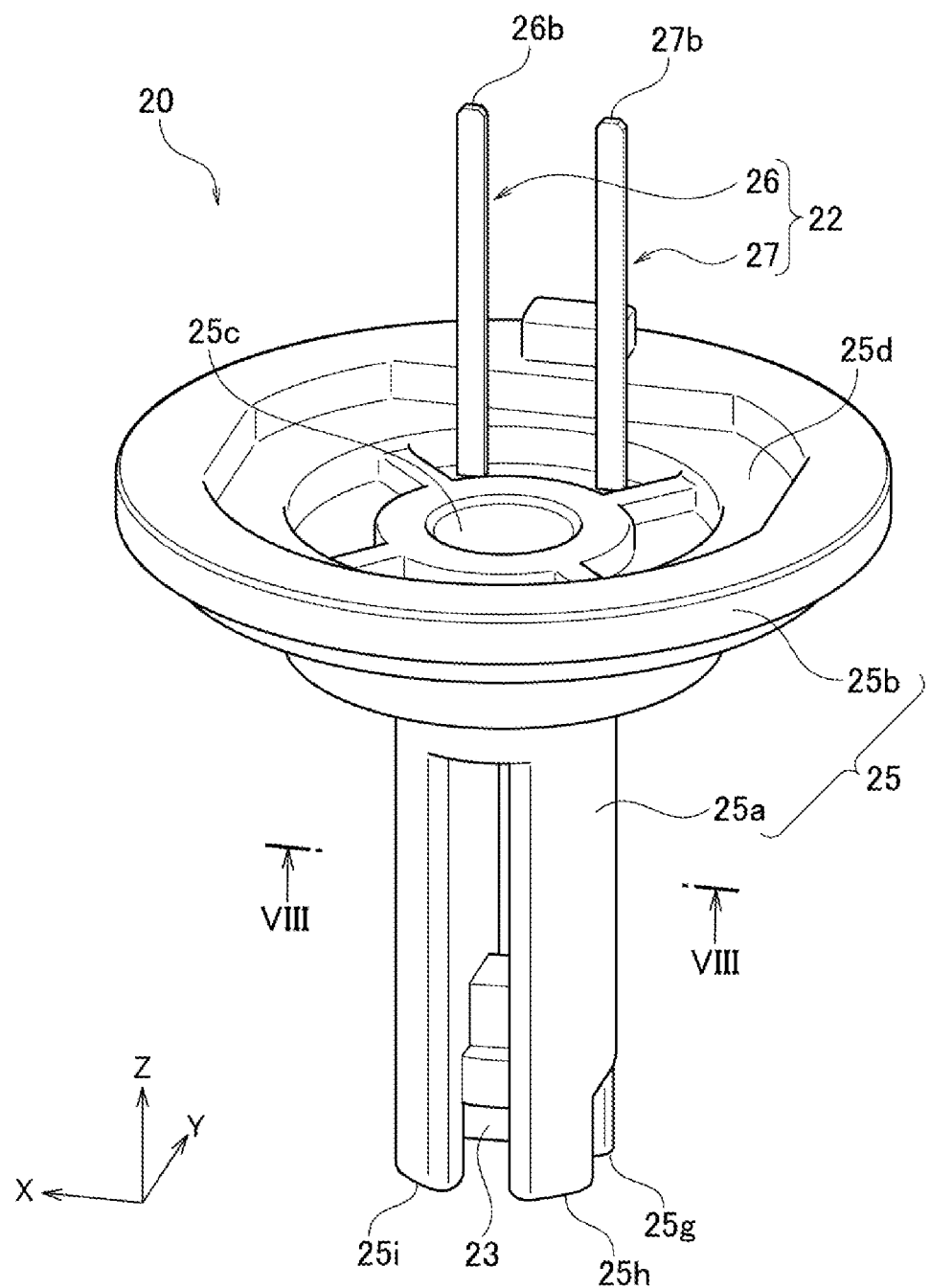
FIG. 4 is a perspective view of a thermistor unit.
Figure 5:
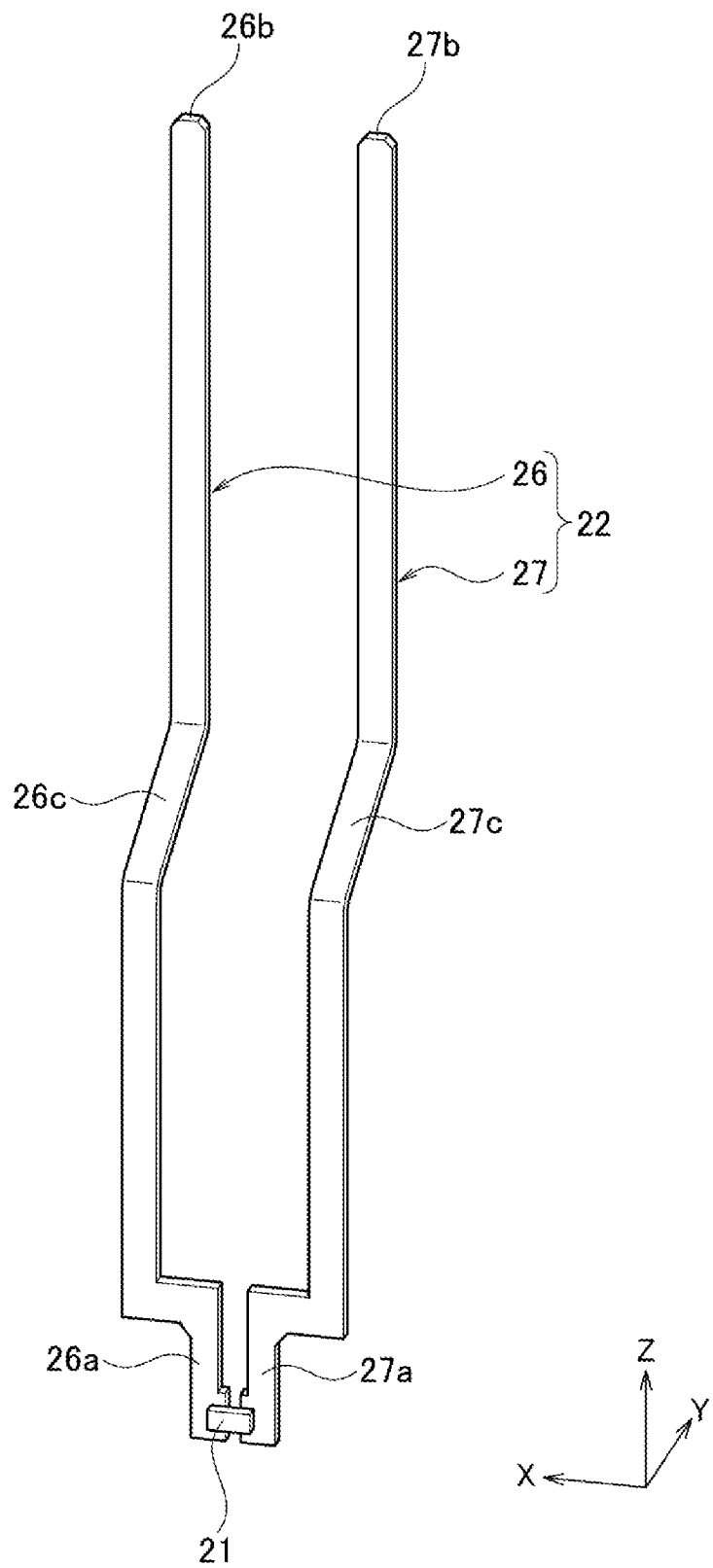
FIG. 5 is a perspective view of a combination of a thermistor and lead portions.
Figure 6:
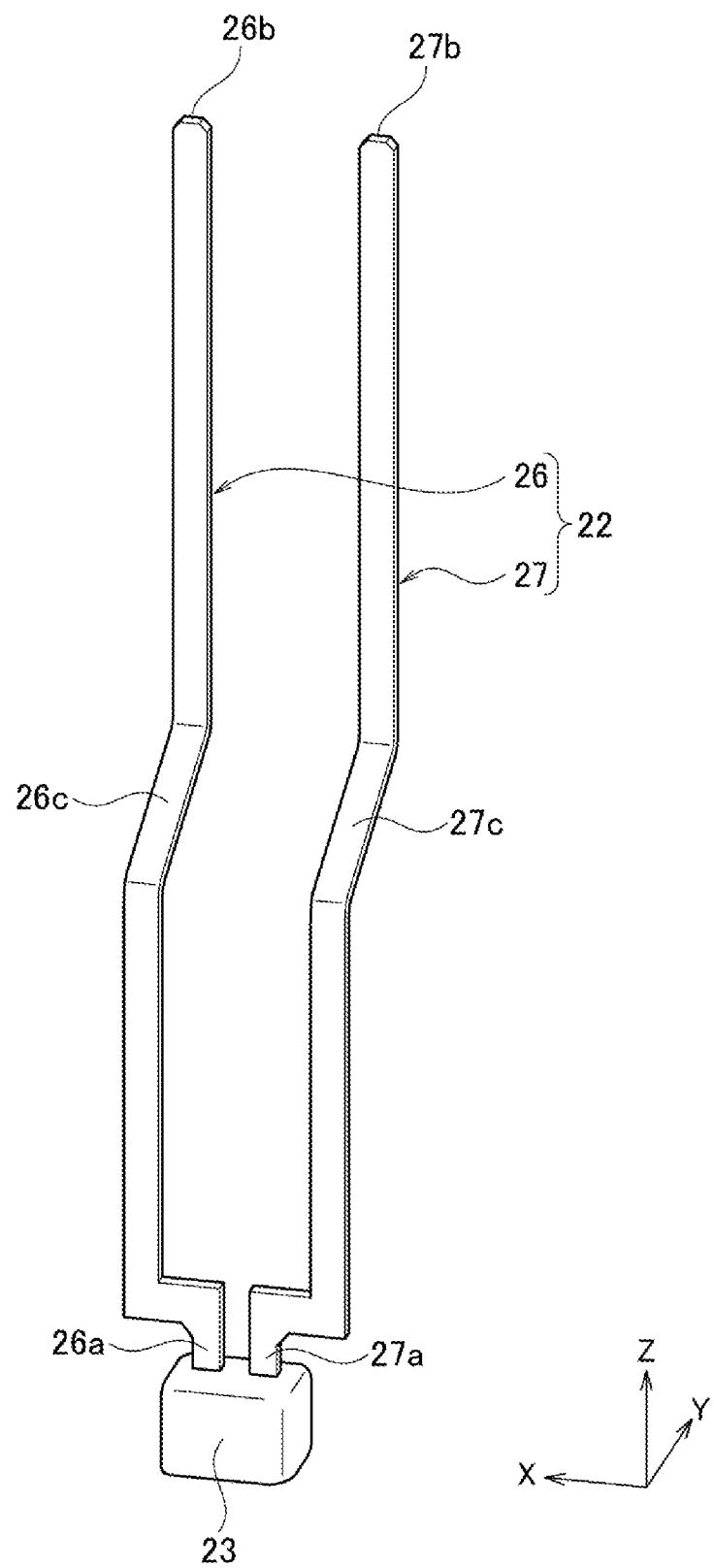
FIG. 6 is a perspective view of a combination of a thermistor exterior portion and the lead portions.

FIG. 4 is a perspective view of the thermistor unit 20. FIG. 5 is a perspective view of a combination of a thermistor 21 and a lead portion 22, which are included in the thermistor unit 20. FIG. 6 is a perspective view of a combination of a thermistor exterior portion 23 and the lead portion 22, which are included in the thermistor unit 20.

The thermistor unit 20 is a temperature detector that detects the temperature of the detection medium M flowing through the flow path 101. The thermistor unit 20 includes the thermistor 21 (see FIG. 5), the lead portion 22, the thermistor exterior portion 23, a protective material 24 (see FIGS. 2 and 7), and a thermistor case 25.

The thermistor 21 is a sensor unit used to detect the temperature of the detection medium M. The thermistor 21 is an electronic component whose resistance value changes due to the change in the temperature of the detection medium M. The type of thermistor employed as the thermistor 21 is not limited. For example, the thermistor 21 may be an NTC thermistor formed by firing an oxide containing manganese (Mn), nickel (Ni), cobalt (Co), and the like.

The lead portion 22 is a conductor that makes the thermistor 21 and the terminal portion 50 electrically communicate with each other. The lead portion 22 includes a first lead 26 and a second lead 27. According to the present embodiment, the first lead 26 functions as an output lead, and the second lead 27 functions as an input lead electrically communicating with an external power source when the combined sensor 1 is used, in accordance with the connection assignment between terminals included in the terminal portion 50 and the pressure sensor module 10.

The lead portion 22 is formed from a metal having excellent conductivity such as copper (Cu) and is formed into a predetermined shape through an etching process, a pressing process, or the like. The first lead 26 and the second lead 27 are symmetrical to each other. The thermistor 21 is held along the X direction between a first tip part 26a, which is one end of the first lead 26, and a second tip part 27a, which is one end of the second lead 27. A first connection end part 26b, which is the other end of the first lead 26, and a second connection end part 27b, which is the other end of the second lead 27, extend substantially along the Z direction from the first tip part 26a and the second tip part 27a, respectively and are connected to terminals included in the terminal portion 50.

The interval between the first lead 26 and the second lead 27 is equal as a whole to the interval between the first connection end part 26b and the second connection end part 27b. Here, the interval between the first connection end part 26b and the second connection end part 27b is set enough to leave a space portion S provided in an extension part 25a of the thermistor case 25. In contrast, since the first tip part 26a and the second tip part 27a are arranged closer to the thermistor 21 than the space portion S in the Z direction in the extension part 25a, the interval between the first tip part 26a and the second tip part 27a may be smaller than the interval between the first connection end part 26b and the second connection end part 27b.

The first lead 26 and the second lead 27 each have a flat rod shape as a whole. The thermistor exterior portion 23 and the thermistor case 25 are successively formed in separate processes onto the combination of the thermistor 21 and the lead portion 22 in FIG. 5. Since the first lead 26 and the second lead 27 are formed in a flat rod shape as a whole, it is possible to increase the rigidity and to maintain the posture with ease in the subsequent molding process.

As will be described in detail below, the thermistor case 25 includes a flow hole part 25c through which the detection medium M flows. Thus, the first lead 26 may include a first bent part 26c to prevent interference with the flow hole part 25c within the thermistor case 25. Similarly, the second lead 27 may include a second bent part 27c.

The thermistor exterior portion 23 is a resin part molded to enclose the thermistor 21 mounted on the lead portion 22. The shape of the thermistor exterior portion 23 is a rectangular parallelepiped to match the outer shape of the thermistor 21. The thermistor exterior portion 23 may be formed into the shape illustrated in FIG. 6 through a transfer molding method using a mold onto the combination of the thermistor 21 and the lead portion 22 in FIG. 5. Here, the resin material forming the thermistor exterior portion 23 may be an epoxy resin excellent in heat resistance, water resistance, electrical insulation, and the like, as thermosetting resin.

For example, as illustrated in FIG. 2, the protective material 24 is a resin material arranged between the extension part 25a of the thermistor case 25 and the thermistor exterior portion 23 to stabilize the holding state of the thermistor exterior portion 23 with the extension part 25a.

As illustrated in FIG. 4, the thermistor case 25 is a unit body made from resin in which a part of the first lead 26 and a part of the second lead 27 are embedded. The thermistor case 25 includes the extension part 25a and a ring part 25b, which are continuous with each other as one body.

The extension part 25a is a column part extending along the Z direction. As illustrated in FIG. 2, when the thermistor unit 20 is combined as one component of the combined sensor 1, the extension part 25a is a part passing through a through hole part 30d of the housing portion 30 in a non-contact manner.

Figure 7:
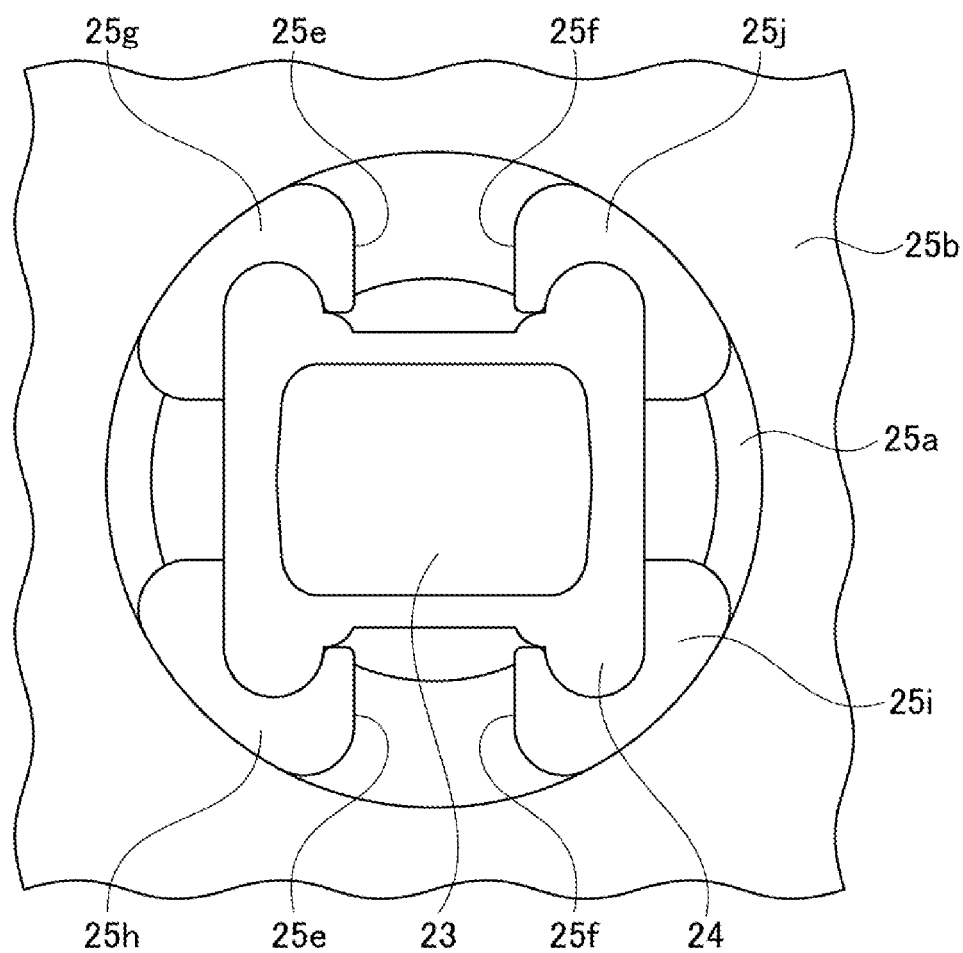
FIG. 7 is a plan view of an extension part of the thermistor unit as viewed from the thermistor exterior portion end.

FIG. 7 is a plan view of the extension part 25a as viewed from the thermistor exterior portion 23. The thermistor exterior portion 23 is positioned approximately at the center of the extension part 25a in the XY plane perpendicular to the Z direction. The extension part 25a supports the thermistor exterior portion 23 while the thermistor exterior portion 23 is exposed to the outside. In particular, among the surfaces of the thermistor exterior portion 23, a surface approximately perpendicular to the Z direction and opposite to the surface held by the extension part 25a is directly exposed to the outside. In the present embodiment, as illustrated in FIG. 2, the thermistor 21 is arranged outside an opening end 30g of the through hole part 30d provided in the housing portion 30.

Figure 8:
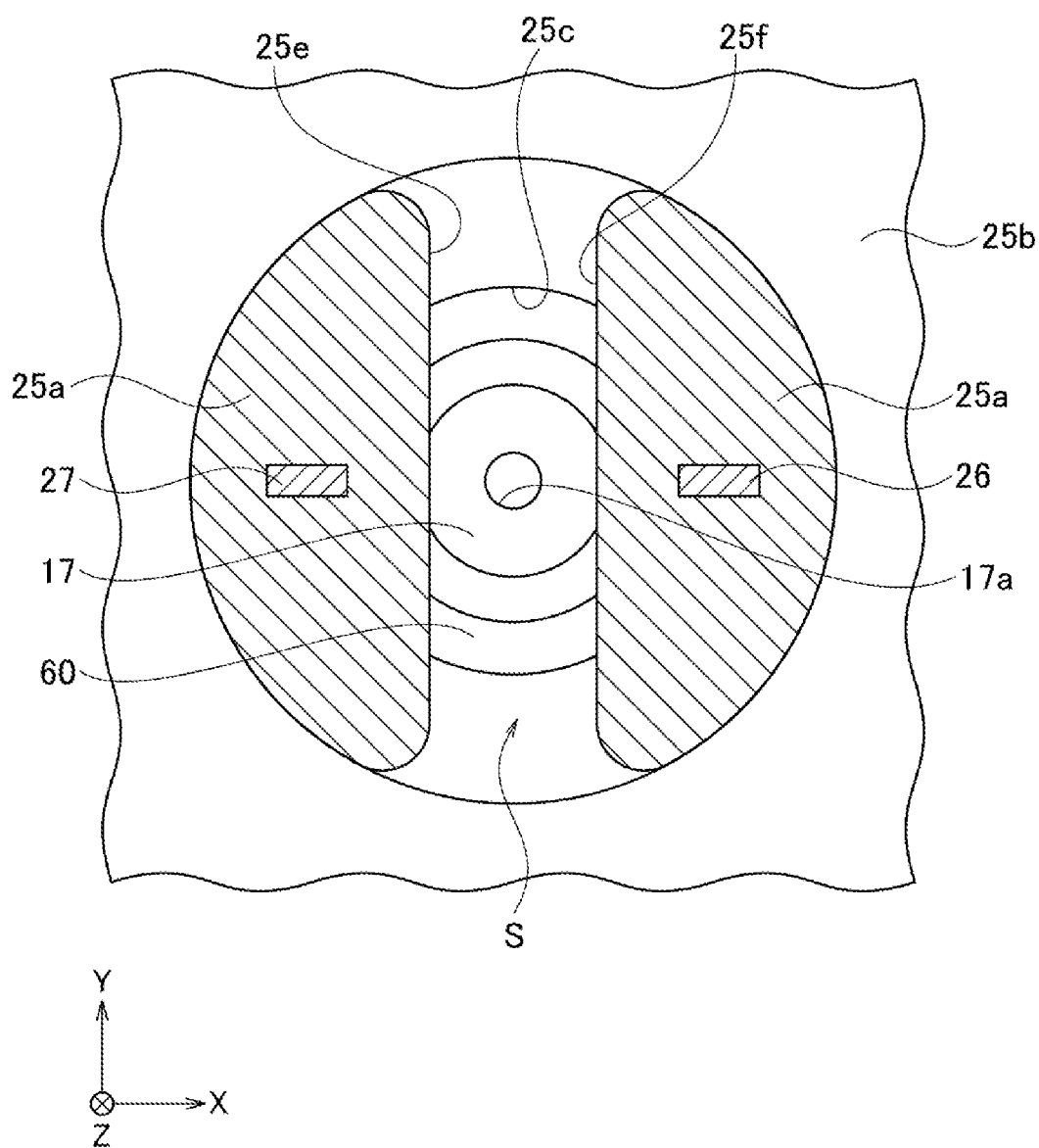
FIG. 8 is a cross-sectional view of the extension part of the thermistor unit.

FIG. 8 is a cross-sectional view of the extension part 25a taken along the line VIII-VIII of FIG. 4. The extension part 25a includes the space portion S formed by being separated into a portion where the first lead 26 is embedded and a portion where the second lead 27 is embedded, along the Z direction, which is the extension direction. Here, the extension part 25a includes a first inner wall surface 25e and a second inner wall surface 25f in an intermediate region in the Z direction. The first inner wall surface 25e and the second inner wall surface 25f are each parallel to a virtual plane including the Z axis and an axis perpendicular to the Z axis and are opposed to each other in a non-contact manner. Here, the axis perpendicular to the Z axis and constituting the virtual plane is the Y axis in the example according to the present embodiment. The first inner wall surface 25e and the second inner wall surface 25f are each continuous with the outer peripheral surface of the extension part 25a on both ends in the Y direction. The first lead 26 is embedded in a portion that is continuous to the second inner wall surface 25f and is surrounded by the second inner wall surface 25f and a part of the extension part 25a. In contrast, the second lead 27 is embedded in a portion that is continuous to the first inner wall surface 25e and is surrounded by the first inner wall surface 25e and a part of the extension part 25a. That is, the space portion S is a space region surrounded by the first inner wall surface 25e and the second inner wall surface 25f. The space portion S thus communicates with the outside of the extension part 25a and also with the flow hole part 25c included in the ring part 25b.

Further, as illustrated in FIG. 7, the extension part 25a includes four rod-shaped parts, that is, a first rod-shaped part 25g, a second rod-shaped part 25h, a third rod-shaped part 25i, and a fourth rod-shaped part 25j, at the distal end part where the thermistor exterior portion 23 is held. Each of the rod-shaped parts protrudes along the Z direction, which is the extension direction of the extension part 25a. In the present embodiment, the outer peripheral surface of each rod-shaped part coincides with the outer peripheral surface of the extension part 25a. A part of each of the rod-shaped parts faces the thermistor exterior portion 23 in a direction orthogonal to the Z direction in a non-contact manner. That is, in the Z direction, tips of respective rod-shaped parts protrude more than the exposed surface of the thermistor exterior portion 23. The rod-shaped parts are arranged spaced apart from each other in the circumferential direction of the extension part 25a. At this time, the rod-shaped parts may be arranged at equal intervals in the circumferential direction of the extension part 25a. Here, among the surfaces of the thermistor exterior portion 23, surfaces facing outward in any of the radial directions on the XY plane from the thermistor exterior portion 23 are directly exposed to the outside from between adjacent rod-shaped parts.

In the extension part 25a, as illustrated in FIG. 7, a part of the side surface of the first rod-shaped part 25g and a part of the side surface of the second rod-shaped part 25h are each continuous with the first inner wall surface 25e. In a similar manner, a part of the side surface of the third rod-shaped part 25i and a part of the side surface of the fourth rod-shaped part 25j are each continuous with the second inner wall surface 25f. With such a configuration, a part of the space portion S communicates with the periphery of the thermistor exterior portion 23 through the space between the first rod-shaped part 25g and the second rod-shaped part 25h and the space between the third rod-shaped part 25i and the fourth rod-shaped part 25j.

The ring part 25b is continuous with the extension part 25a in the central region and along the Z direction. The outermost diameter of the ring part 25b is larger than the outer diameter of the extension part 25a. As illustrated in FIG. 2, the ring part 25b is a part supported by a housing part 30c of the housing portion 30 via a second O-ring 61 when the thermistor unit 20 is combined as one component of the combined sensor 1.

The ring part 25b includes the flow hole part 25c and a recessed part 25d. The flow hole part 25c is provided at the center of the ring part 25b along the Z direction. As illustrated in FIG. 2, the flow hole part 25c communicates with the space portion S provided in the extension part 25a and thus allows the detection medium M to flow between the end continuous with the extension part 25a and the end facing the pressure sensor module 10. The recessed part 25d houses at least a part of the pressure sensor module 10.

The thermistor case 25 may be formed into the shape illustrated in FIG. 4 through an insert molding method using a mold onto the combination of the thermistor exterior portion 23 and the lead portion 22 illustrated in FIG. 6. Here, the resin material forming the thermistor case 25 may be, for example, PPS (polyphenylenesulfide) resin excellent in heat resistance, flame retardancy, and the like, as thermoplastic resin. That is, the thermistor case 25 is formed from a resin material different from the resin material forming the thermistor exterior portion 23.

As illustrated in FIG. 4, before the thermistor unit 20 is combined as one component of the combined sensor 1, a part of the first lead 26 including the first connection end part 26b and a part of the second lead 27 including the second connection end part 27b are simply exposed from the ring part 25b. That is, the thermistor unit 20 is treated as an independent unit before being combined as one component of the combined sensor 1.

The housing portion 30 is a member formed from a metal material such as stainless steel and serves as a part of the exterior of the combined sensor 1. The housing portion 30 includes a housing body 30a and a mounting part 30b, which are continuous with each other as one body.

The housing body 30a includes the housing part 30c for housing the pressure sensor module 10 and the thermistor unit 20. One end of the housing body 30a in the Z direction is continuous with the mounting part 30b. The other end of the housing body 30a in the Z direction includes an introduction port 30f for inserting a connection part 41b of the connector portion 40. The opening diameter of the introduction port 30f is smaller than the maximum inner diameter of the housing part 30c. The housing part 30c houses the pressure sensor module 10 and the thermistor unit 20 so that the pressure sensor module 10 is arranged near the introduction port 30f, while the thermistor unit 20 is arranged near the mounting part 30b. Note that the outer periphery of the housing body 30a may be subjected to hexagonal processing for engaging a fastening tool when the combined sensor 1 is mounted on the mounted member 100.

When the combined sensor 1 is mounted on the mounted member 100, the mounting part 30b is connected to the mounting hole part 102 formed in the mounted member 100. In the present embodiment, the screw part 30e is formed on the outer periphery of the mounting part 30b. Note that in FIG. 1, a depiction of the screw part 30e in the mounting part 30b is omitted. The mounting part 30b includes in the inner peripheral surface the through hole part 30*d* including the opening end 30*g* as one end. As illustrated in FIG. 2, when the combined sensor 1 is mounted on the mounted member 100, the opening end 30*g* is open to the flow path 101.

The connector portion 40 is formed from a resin material such as PPS resin and serves as a part of the exterior of the combined sensor 1 together with the housing portion 30. The connector portion 40 includes a connector 41 and the terminal portion 50.

The connector 41 connects with an external connector of an external wiring member such as a wire harness routed in a vehicle. The connector 41 includes the connector body 41*a* and the connection part 41*b*, which are continuous with each other as one body. The connector body 41*a* includes an opening part 41*c*, one end of which is open to the outside and exposes a part of each terminal included in the terminal portion 50 to the outside. The connector body 41*a* includes an air hole part, which is not illustrated, that allows the opening 41*c* and a housing recessed part 41*d* provided in the connection part 41*b* to communicate with each other. The connection part 41*b* is connected to the housing part 30*c* of the housing portion 30 when the connector portion 40 is mounted on the housing portion 30. The maximum diameter of the connection part 41*b* is larger than the opening diameter of the introduction port 30*f* of the housing body 30*a*. The connection part 41*b* includes the housing recessed part 41*d* therein. A part of the pressure sensor module 10 may be housed in the housing recessed part 41*d*.

The terminal portion 50 includes a first terminal 51, a second terminal 52, a third terminal 53, a fourth terminal 54, and a potting portion 55. Each of the first terminal 51, the second terminal 52, the third terminal 53, and the fourth terminal 54 is a metal rod for electrically connecting the pressure sensor module 10 or the thermistor unit 20 to the external wiring of the external connector. For example, the following functions are assigned to the terminals. The first terminal 51 may be a terminal electrically communicating with the signal processing circuit 13 of the pressure sensor module 10 and transmitting an output related to pressure detection to the outside. The second terminal 52 may be an earth terminal electrically communicating with the signal processing circuit 13. The third terminal 53 may be a terminal electrically communicating with the signal processing circuit 13 and the second lead 27 of the thermistor unit 20 and supplied with power from the outside. The fourth terminal 54 may be a terminal electrically communicating with the first lead 26 of the thermistor unit 20 and transmitting an output related to temperature detection to the outside. The potting portion 55 is a resin body protecting welding portions between the third terminal 53 and the second lead 27, and the fourth terminal 54 and the first lead 26, for example.

Next, the assembly of the combined sensor 1 is described.

First, a worker prepares the pressure sensor module 10, the thermistor unit 20, the housing portion 30, and the connector portion 40 prior to assembling the combined sensor 1. Among these, the thermistor unit 20 is manufactured in advance as one unit through a first molding process using a transfer molding method and a second molding process using an insert molding method. For example, multiple thermistor units 20 including thermistors 21 of different types are prepared in advance, and thus when assembling the combined sensor 1, the worker can select a thermistor unit 20 including an appropriate thermistor 21 and start the work quickly.

The pressure sensor module 10 may also be manufactured as one unit in advance. For example, multiple pressure sensor modules 10 having different pressure ranges are prepared in advance, and thus when assembling the combined sensor 1, the worker can select a pressure sensor module 10 having an appropriate pressure range and start the work quickly.

Next, the worker assembles the pressure sensor module 10 into the recessed part 25*d* of the thermistor unit 20 via the first O-ring 60 and also joins the terminal portion 50 to the pressure sensor module 10 and the thermistor unit 20. At this time, the first O-ring 60 is pressed by the stem 17 on the pressure sensor module 10 side and the flow hole part 25*c* on the thermistor unit 20 side and comes into close contact with both wall parts. Thus, a unit of a combination of the pressure sensor module 10 and the thermistor unit 20 illustrated in FIG. 3 is formed.

Next, the worker inserts the second O-ring 61 into the housing part 30*c* of the housing portion 30 in advance and subsequently inserts the unit of the combination of the pressure sensor module 10 and the thermistor unit 20 into the housing part 30*c*. At this time, the extension part 25*a* of the thermistor unit 20 passes through the second O-ring 61 and then through the through hole part 30*d* of the housing portion 30. The ring part 25*b* of the thermistor unit 20 is supported by the housing part 30*c* via the second O-ring 61. When the ring part 25*b* is supported by the housing part 30*c*, the thermistor exterior portion 23 enclosing the thermistor 21 protrudes outward from the opening end 30*g* of the through hole part 30*d*.

Then, the worker inserts the connection part 41*b* of the connector portion 40 into the housing part 30*c* of the housing portion 30, while passing the terminals of the terminal portion 50 into corresponding multiple holes, which are not illustrated, formed in advance in the connector 41 of the connector portion 40. Thus, the connection part 41*b* is connected to the housing part 30*c*, and the connector portion 40 is connected to the housing portion 30. At this time, in the housing part 30*c*, the connection part 41*b* presses at least one of the pressure sensor module 10 or the thermistor unit 20 toward the mounting part 30*b*. The second O-ring 61 is pushed by the ring part 25*b* of the thermistor unit 20 and the housing part 30*c* of the housing portion 30 and is brought into close contact with both wall parts. With such a series of operations, the assembly of the combined sensor 1 is completed.

Next, the operation of the combined sensor 1 is described with reference to FIG. 2.

In the combined sensor 1, the flow hole part 25*c* of the thermistor unit 20 and the stem 17 of the pressure sensor module 10 are sealed via the first O-ring 60 on the inner peripheral surface side of the thermistor unit 20. In contrast, the outer peripheral wall of the ring part 25*b* of the thermistor unit 20 and the inner peripheral wall of the housing part 30*c* of the housing portion 30 are sealed via the second O-ring 61 on the outer peripheral surface side of the thermistor unit 20. The extension part 25*a* of the thermistor unit 20 includes the space portion S and is not in contact with the through hole part 30*d* through which the extension part 25*a* passes. With such a configuration, the extension part 25*a* is filled with the detection medium M entering the through hole part 30*d* from the flow path 101, and the detection medium M also enters the space portion S.

First, regarding the detection of the pressure of the detection medium M, in the housing part 30*c* of the housing portion 30, a part of the stem 17 is in contact with the space portion S of the extension part 25*a*, and the hole 17*a* of the stem 17 communicates with the space portion S. The pressure sensor element 11 in the pressure sensor module 10 detects the pressure of the detection medium M reaching the diaphragm 15 through the space portion S and the hole 17a.

Next, regarding the detection of the temperature of the detection medium M, the thermistor exterior portion 23 protrudes outward in advance from the opening end 30g of the through hole part 30d. Thus, when the combined sensor 1 is mounted on the mounted member 100, the mounting part 30b including the through hole part 30d on the inner peripheral surface side is arranged in the mounting hole part 102 of the mounted member 100, and consequently the thermistor exterior portion 23 is arranged in the flow path 101. Here, among the surfaces of the thermistor exterior portion 23, a surface facing outward in one direction along the Z direction is exposed in the flow path 101 without any interruption. Among the surfaces of the thermistor exterior portion 23, surfaces facing outward in any of the radial directions on the XY plane from the thermistor exterior portion 23 are exposed to the flow path 101 through adjacent rod-shaped parts, such as the second rod-shaped part 25h. Thus, the detection medium M flowing through the flow path 101 is directly in contact with the thermistor exterior portion 23 as indicated by the hollow arrow in FIG. 2, and thus the thermistor 21 enclosed in the thermistor exterior portion 23 captures a temperature change of the detection medium M with high accuracy: In addition, even when the detection medium M is stagnant in the flow path 101, the thermistor exterior portion 23 is in direct contact with the detection medium M, and thus the thermistor 21 captures a temperature change of the stagnant detection medium M with high accuracy.

Here, the space portion S provided in the extension part 25a is positioned between the first lead 26 and the second lead 27 embedded in the extension part 25a along the extension direction of the extension part 25a. Thus, the first lead 26 receives not only the heat of the detection medium M through the outer peripheral wall surface of the extension part 25a but also the heat of the detection medium M through the second inner wall surface 25f facing the space portion S. In a similar manner, the second lead 27 receives the heat of the detection medium M not only through the outer peripheral wall surface of the extension part 25a but also through the first inner wall surface 25e facing the space portion S.

Next, the effect of the combined sensor 1 is described.

The combined sensor 1 according to the present embodiment includes the pressure detector (pressure sensor module 10) that detects the pressure of the detection medium M flowing through the flow path 101, and the temperature detector (thermistor unit 20) that detects the temperature of the detection medium M using the thermistor 21. The combined sensor 1 includes the housing portion 30 housing the temperature detector closer to the flow path 101 than the pressure detector and including the through hole part 30d at the inner surface side thereof, one end of through hole part 30d being the opening end 30g that is open to the flow path 101. The temperature detector includes the first lead 26 and the second lead 27 connected to the thermistor 21, and the thermistor case 25 in which a part of the first lead 26 and a part of the second lead 27 are embedded. The thermistor case 25 includes the extension part 25a passing through the through hole part 30d of the housing portion 30, and the ring part 25b including the flow hole part 25c for allowing the detection medium M to flow between the end continuous with the extension part 25a and the end facing the pressure detector. The thermistor 21 is supported by the extension part 25a to be arranged outside the opening end 30g of the housing portion 30. The extension part 25a is provided by being separated into the portion where the first lead 26 is embedded and the portion where the second lead 27 is embedded, along the extension direction of the extension part 25a, and includes the space portion S communicating with the flow hole part 25c of the ring part 25b and with the outside.

First, in the combined sensor 1, the extension part 25a of the thermistor case 25 is provided with the space portion S for separating the portion where the first lead 26 is embedded and the portion where the second lead 27 is embedded. Thus, even when the thermistor exterior portion 23 is held at the distal end of the extension part 25a to be exposed in the flow path 101, it is possible for the pressure detector to detect the pressure of the detection medium M without any trouble.

In the combined sensor 1, when the combined sensor 1 is mounted on the mounted member 100, for example, the space portion S is also filled with the detection medium M. Thus, as described above as the effect of the temperature detection, the first lead 26 and the second lead 27 individually receive heat of the detection medium M through both the outer peripheral wall of the extension part 25a, and the first inner wall surface 25e or the second inner wall surface 25f facing the space portion S. Thus, it is possible to suppress the heat radiation from the first lead 26 or the second lead 27, and thus to reduce the heat radiation portion as a whole of the temperature detector and to improve the temperature responsiveness.

As described above, according to the present embodiment, it is possible to provide the combined sensor 1 that improves the temperature responsiveness.

According to the present embodiment, the thermistor 21 is arranged outside the opening end 30g of the housing portion 30, and thus when the combined sensor 1 is mounted on, for example, the mounted member 100, the thermistor 21 is arranged in the flow path 101. Thus, as described above as the effect related to the temperature detection, it is possible for the thermistor 21 to detect a temperature change of the detection medium M flowing in the flow path 101 with high accuracy. Further, it is possible for the thermistor 21 to detect a temperature change of the stagnant detection medium M with high accuracy. That is, it is possible for the combined sensor 1 to improve the temperature measurement accuracy.

In the combined sensor 1 according to the present embodiment, the thermistor 21 may be enclosed in the thermistor exterior portion 23 in a rectangular parallelepiped formed from a resin material. Here, the extension part 25a may support the thermistor exterior portion 23 with the thermistor exterior portion 23 exposed to the outside through the first lead 26 and the second lead 27.

In the combined sensor 1, it is possible for the thermistor exterior portion 23 to protect the thermistor 21 so that the detection medium M does not directly contact with the thermistor 21. Since the thermistor exterior portion 23 can be formed in a rectangular parallelepiped shape as necessary to enclose the thermistor 21, it is possible to transfer the heat from the detection medium M to the thermistor 21 over a short distance, which can contribute to a reduction in thermal resistance.

In the combined sensor 1 according to the present embodiment, the thermistor case 25 may be formed from a resin material different from the resin material forming the thermistor exterior portion 23.

In the above example, the resin material forming the thermistor exterior portion 23 is epoxy resin, and the resin material forming the thermistor case 25 is PPS resin. In the combined sensor 1, by selecting an appropriate resin material in each step, it is possible to realize manufacturing of the temperature detector through the first molding step using the transfer molding method and the second molding step using the insert molding method.

In the combined sensor 1 according to the present embodiment, the extension part 25a may have multiple rod-shaped parts that partially face the thermistor exterior portion 23 in a direction orthogonal to the extension direction and protrude along the extension direction while being spaced apart from each other.

Here, in the above description, four rod-shaped parts, which are the first rod-shaped part 25g, the second rod-shaped part 25h, the third rod-shaped part 25i, and the fourth rod-shaped part 25j, are exemplified.

In the combined sensor 1, the tips of the rod-shaped parts protrude over the exposed surface of the thermistor exterior portion 23 in the extension direction of the extension part 25a, and thus it is possible to protect the thermistor exterior portion 23 from impact and the like. Since the rod-shaped parts are arranged in the circumferential direction of the extension part 25a with a space therebetween, it is possible to keep the exposure of the thermistor exterior portion 23 to the outside, that is, to the flow path 101, unobstructed as much as possible.

In the combined sensor 1 according to the present embodiment, a part of the space portion S included in the extension part 25a may communicate with the periphery of the thermistor exterior portion 23.

The combined sensor 1 enables the detection medium M flowing in the flow path 101 to be introduced into the space portion S, not only from a region facing the through hole part 30d of the housing portion 30 but also from a region communicating with the periphery of the thermistor exterior portion 23. Thus, the detection medium M is more easily introduced into the space portion S, and thus it is possible to suppress the heat radiation from the first lead 26 or the second lead 27 more easily.

The combined sensor 1 according to the present embodiment may include the connector portion 40 including a terminal, such as the third terminal 53, to which the first lead 26 or the second lead 27 is joined. The first connection end part 26b or the second connection end part 27b, which are respective ends of the first lead 26 and the second lead 27 connected to the third terminal 53 and the like, may be exposed from the ring part 25b. Here, the temperature detector may be one unit including at least the thermistor exterior portion 23 enclosing the thermistor 21, the first lead 26 and the second lead 27, and the thermistor case 25.

In the combined sensor 1, it is possible to simplify the structure using the temperature detector as one unit. Since the temperature detector is manufactured as one unit in advance, it is possible to improve the ease of assembly of the combined sensor 1 by a worker, as described above with respect to the assembly of the combined sensor 1. While certain embodiments have been described, these embodiments have been presented by way of example only, and are not intended to limit the scope of the inventions. Indeed, the novel embodiments described herein may be embodied in a variety of other forms: furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A combined sensor, comprising:
a pressure detector that detects a pressure of a detection medium flowing through a flow path;
a temperature detector that detects a temperature of the detection medium using a thermistor; and
a housing portion that houses the temperature detector closer to the flow path than the pressure detector and includes a through hole part at an inner peripheral side of the housing portion, one end of the through hole part being an opening end that is open to the flow path, wherein
the temperature detector includes a first lead and a second lead connected to the thermistor, and a thermistor case in which a part of the first lead and a part of the second lead are embedded,
the thermistor case includes an extension part that passes through the through hole part of the housing portion, and a ring part that includes a flow hole part having one end continuous with the extension part and another end facing the pressure detector, the detection medium flowing through the flow hole part,
the thermistor is supported by the extension part to be arranged outside the opening end of the housing portion, and
the extension part is provided by being separated into a portion where the first lead is embedded and a portion where the second lead is embedded, along an extending direction of the extension part, and includes a space portion communicating with the flow hole part of the ring part and with the outside.

2. The combined sensor according to claim 1, wherein
the thermistor is enclosed in a thermistor exterior portion in a rectangular parallelepiped shape formed from a resin material, and
the extension part supports via the first lead and the second lead, the thermistor exterior portion in a state where the thermistor exterior portion is exposed to the outside.

3. The combined sensor according to claim 2, wherein
the thermistor case is formed from a resin material different from the resin material forming the thermistor exterior portion.

4. The combined sensor according to claim 2, wherein
the extension part includes multiple rod-shaped parts, the rod-shaped parts each projecting along the extending direction while being spaced apart from each other, and a part of each of the rod-shaped parts facing the thermistor exterior portion in a direction orthogonal to the extending direction.

5. The combined sensor according to claim 2, wherein
a part of the space portion included in the extension part communicates with a periphery of the thermistor exterior portion.

6. The combined sensor according to claim 2, further comprising:
a connector portion that includes terminals to which the first lead and the second lead are connected, wherein
end parts of the first lead and the second lead, connected to the terminals, are exposed from the ring part, and
the temperature detector constitutes one unit including at least the thermistor exterior portion enclosing the thermistor, the first lead and the second lead, and the thermistor case.

* * * * *